United States Patent
Cieslinski et al.

(10) Patent No.: US 8,582,010 B2
(45) Date of Patent: Nov. 12, 2013

(54) IMAGE SENSOR

(75) Inventors: Michael Cieslinski, Ottobrunn (DE);
Uwe Wessely, München (DE); Achim Oehler, Müchen (DE)

(73) Assignee: Arnold & Richter Cine Technik GmbH & Co. Betriebs KG (DE)

( * ) Notice: Subject to any disclaimer, the term of this patent is extended or adjusted under 35 U.S.C. 154(b) by 297 days.

(21) Appl. No.: 12/944,555

(22) Filed: Nov. 11, 2010

(65) Prior Publication Data

US 2011/0279722 A1   Nov. 17, 2011

(30) Foreign Application Priority Data

Nov. 13, 2009  (DE) .......................... 10 2009 053 281

(51) Int. Cl.
*H04N 5/335* (2011.01)
*H04N 5/235* (2006.01)

(52) U.S. Cl.
USPC .......................................... 348/308; 348/362

(58) Field of Classification Search
USPC ......... 348/208.1, 208.6, 208.11, 208.13, 308, 348/323; 382/164, 194, 274
See application file for complete search history.

(56) References Cited

U.S. PATENT DOCUMENTS

| | | | |
|---|---|---|---|
| 5,283,426 A | 2/1994 | Bowlby, Jr. et al. | |
| 7,324,144 B1 | 1/2008 | Koizumi | |
| 7,777,798 B2 * | 8/2010 | Mabuchi | 348/308 |

(Continued)

FOREIGN PATENT DOCUMENTS

| | | |
|---|---|---|
| DE | 102007045448 A1 | 4/2009 |
| EP | 2040458 A2 | 9/2008 |
| JP | 2008099158 A | 4/2008 |
| JP | 2008252814 A | 10/2008 |

OTHER PUBLICATIONS

European Search Report of the European Patent Office, corresponding to European Patent Application No. 10 014 399.9, mailed May 4, 2012.
German Search Report dated Oct. 26, 2010 and English Translation thereof.

*Primary Examiner* — Trung Diep
(74) *Attorney, Agent, or Firm* — Amster, Rothstein & Ebenstein LLP

(57) ABSTRACT

The invention relates to an image sensor, in particular to a CMOS image sensor, for digital cameras, having a plurality of pixels arranged in rows and columns, wherein the respective pixel comprises: a light sensitive detector element to generate electrical charge from incident light during an exposure procedure, a readout node, a transfer gate to which a transfer control pulse can be applied to allow a charge transfer from the detector element to the readout node, and a reset device to reset a charge present in the readout node to a reference value. The image sensor furthermore has a control device for the control of the transfer gate and of the of the reset device of the respective pixel. The control device is designed so that the respective pixel is read out in a plurality of readout steps during the ongoing charge generation in a single exposure procedure, and indeed such that a respective transfer control pulse is applied to the transfer gate for each of the plurality of readout steps and a respective readout result is then produced; wherein the reset device is activated between the transfer control pulses of the respective exposure procedure; and wherein only the last transfer control pulse enables a complete charge transfer of the respective charge present in the detector element to the readout node.

20 Claims, 7 Drawing Sheets

(56) References Cited

U.S. PATENT DOCUMENTS

| | | | |
|---|---|---|---|
| 8,179,464 B2* | 5/2012 | Schemmann et al. | 348/308 |
| 2003/0058360 A1* | 3/2003 | Liu et al. | 348/308 |
| 2005/0083421 A1 | 4/2005 | Berezin et al. | |
| 2006/0011810 A1 | 1/2006 | Ando et al. | |
| 2006/0102827 A1 | 5/2006 | Kasuga et al. | |
| 2008/0079841 A1 | 4/2008 | Cieslinksi | |
| 2010/0073538 A1 | 3/2010 | Cieslinski | |
| 2010/0245644 A1* | 9/2010 | Ellis-Monaghan et al. | 348/308 |

* cited by examiner

IMAGE SENSOR

The present invention relates to an image sensor, in particular to a CMOS image sensor, for digital cameras. The image sensor includes a plurality of pixels arranged in rows and columns. The pixels include in each case a light sensitive detector element to generate an electrical charge from incident light during an exposure procedure, a readout node, a transfer gate to which a transfer control pulse can be applied to allow a charge transfer from the detector element to the readout node, and a reset device to reset a charge present in the readout node to a reference value. The image sensor furthermore includes a control device for the control of the transfer gate and of the of the reset device of the respective pixel. The present invention furthermore relates to a method for the reading out of an image sensor, in particular of a CMOS image sensor, for digital cameras.

A digital or an electronic camera can be used, for example, to digitally record image sequences which are later shown in a cinema. It is advantageous in this respect if the camera has high light sensitivity and simultaneously a high dynamic range. These two properties are decisive for the quality of the recording and they help to reduce the costs for the illumination of the scene, for example.

The image sensor of such a camera in this respect converts light incident through the objective of the camera into electrical signals. For this purpose, the image sensor includes a plurality of light-sensitive elements, the so-called pixels. The incident light is converted into electrical charge in the pixels. To read out an image taken by the camera, the pixels are addressed in order, for example, and a voltage proportional to the charge of the respective pixel is generated which is directed to an output of the image sensor.

Figure 1:
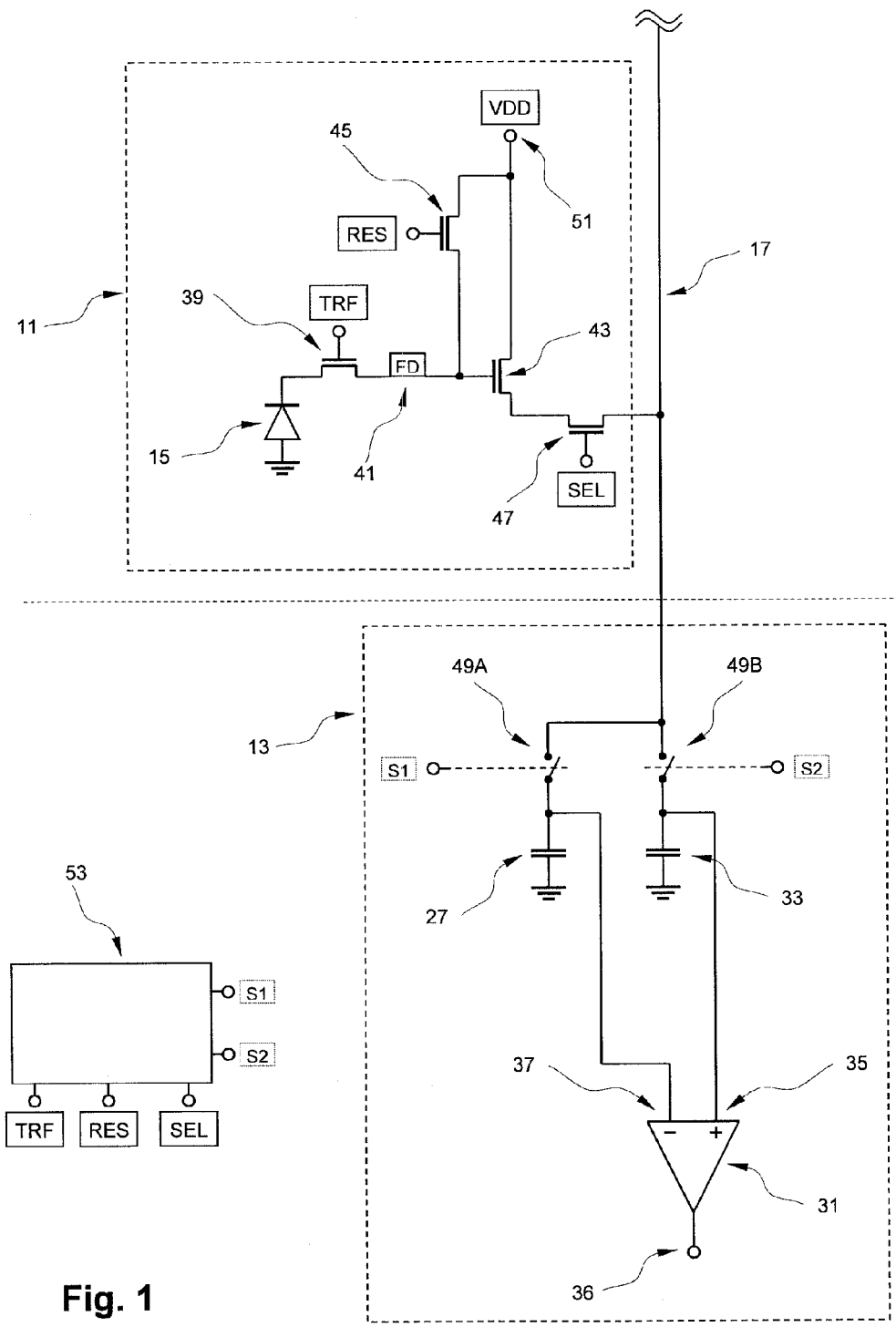

An image sensor of the initially named kind can be made, for example, as shown in FIG. 1 in which only one single pixel 11 is shown as a representative. The pixel 11 shown includes a light-sensitive detector element in the form of a so-called pinned diode (PD) 15 which is charge coupled via a transfer gate 39 to a readout node 41 which is made as a so-called floating diffusion (FD). The readout node 41 is connected to the gate of a converter field effect transistor (FET) 43 which is made as a source follower and which represents a charge voltage converter circuit. Furthermore the readout node 41 is connected via a reset FET 45 to a positive voltage supply 51. One of the two channel connections of the converter FET 43 is likewise connected to the positive supply 51, whereas the other of the two channel connections of the converter FET 43 is connectable via a selection FET 47 which acts as a line selection switch to the column line 17 associated with the pixel shown.

The column line 17 is provided to connect the pixels arranged in the associated column, in particular pixels 11, to a common column amplifier circuit 13. The column amplifier circuit 13 includes a first capacitor 27 which is connected to ground with one connection and is connectable with the other connection via a switch 49A selectively to the column line 17. The column amplifier circuit 13 furthermore includes a second capacitor 33 which is likewise connected to ground with one connection and is connectable with the other connection via a further switch 49B likewise selectively to the column line 17. The column amplifier circuit 13 furthermore includes an amplifier 31 at whose negative input 37 the voltage applied to the first capacitor 27 is input and at whose positive input 35 the voltage applied to the second capacitor 33 is input.

The transfer gate 39 is controllable via a control line TRF; the reset FET 45 controllable via a control line RES; the selection FET 47 is controllable via a control line SEL; the switch 49E is controllable via a control line 131; and the switch 49B is controllable via a control line S2, in each case by a common control device 53 of the image sensor.

The operation of such a pixel 11 will be described in the following by way of example based on a 3.3 V CMOS technology.

The light incident during an exposure procedure is converted by the pinned diode 15 into electrical charge so that the pinned diode 15 fills with electrons. In this respect, the control lines TRF, RES and SEL are first held at 0 V, i.e. the switches 39, 45, 47 hereby controlled are open.

For the reading out, in a first step (Reset 1), a voltage of 3.3 V is briefly applied to the control line RES to remove the charge formed by leakage currents and/or scattered light from the readout nodes 41.

In a second step (reading the reference value), a voltage of 3.3 V is applied to the control line SEL (closing of the switch 47) and the switch 49A is closed. The voltage level of the readout node 41 is thereby switched via the converter FET 43 and the selection FET 47 to the column line 17 and is thus directed to the capacitor 27. After the system has undergone transient oscillation, the capacitor 27 is separated from the pixel 11 again by opening the switch 49A.

Subsequently, in a third step (transfer of the charge), a voltage of 3.3 V is briefly applied to the control line TRF so that the electrons can flow from the pinned diode 15 to the readout node 41.

Then, in a fourth step (reading of the signal), the switch 49B is closed. The voltage level of the readout node 41 is thereby switched via the converter FET 43 and the selection FET 47 to the column line 17 and is thus directed to the capacitor 33. After the transient oscillation of the system, the capacitor 33 is again separated from the pixel 11 by opening the switch 49B and the control line SE again has 0 V applied.

Finally, in a fifth step (Reset 2), a voltage of 3.3 V is briefly applied to the control lines RES and TRF to remove the charge from the readout node 41 and any possible residual charges from the pinned diode 15. The exposure procedure is hereby completed and the next exposure procedure can again start with a completely "empty" pixel.

A voltage is now applied to the output 36 of the amplifier 31 which corresponds to the charge amount generated by the exposure procedure in the pinned diode 15.

The circuit of the column amplifier shown is purely an example for a plurality of possible variants which work with so-called correlated double sampling. In this process, the level of the empty readout node 41 is generally taken as a reference value and is deducted from the level of the signal to reduce the noise. There are also circuits in which the aforesaid deduction of the level of the empty readout node 41 is dispensed with, e.g. to increase the speed on reading out. In this case, the voltage of the capacitor 33 is forwarded directly to the output 36.

To ensure high light sensitivity in the image sensor described with reference to FIG. 1, it is necessary that the charges generated in the pinned diode 15 by the incident light effect a high voltage at the gate of the converter FET 43. This is achieved in that the capacitance of the readout node 41 is kept small. With a capacitance of, for example, 4 fF, each electron effects a voltage change of 40 µV. If the camera has thermal noise of e.g. 200 µV, 5 electrons or 5 photons are thus already detectable. This corresponds to the noise limit of the respective pixel.

The image sensor described with reference to FIG. 1 thus admittedly has high light sensitivity, but only a small dynamic range. With the aforesaid capacitance of 4 fF, the readout node 41 is already completely filled with approximately 30,000 electrons. The saturation limit of the respective pixel is therefore reached with this charge amount. 30,000 electrons effect a voltage of approximately 1 V, whereby the limit of the electrical range is reached which can be forwarded to the outputs.

Taking the noise limit (5 electrons) into account, a maximum achievable dynamic of 6,000:1 results. A photographic film, in contrast, has a dynamic of more than 30,000:1.

It is known in order to increase the dynamic range to combine at least two shots which have different exposure times, with the shots being taken sequentially. This is, however, not possible with moving objects due to the time offset of the shots to be combined.

It is the underlying object of the invention to provide a possibility also to ensure a high dynamic range in addition to high light sensitivity in an image sensor or in a method of the initially named kind.

This object is satisfied by an image sensor having the features of claim 1 and in particular in that the control device is designed so that the respective pixel is read out in a plurality of readout steps during an ongoing charge generation within a single exposure procedure (i.e. within a single exposure process or exposure operation), and indeed such that a respective transfer control pulse is applied to the transfer gate for each of the plurality of readout steps and a respective readout result is then generated, wherein the reset device is activated between the transfer control pulses of the respective exposure procedure, and wherein only the last transfer control pulse allows a complete charge transfer of the respective charge present in the detector element to the readout node.

Provision is therefore made in accordance with the invention not only to read out a detector element once and at the end of the exposure procedure, but also additionally before it during the still ongoing exposure procedure. A plurality of readout steps are therefore provided for a single exposure procedure, wherein the transfer gate is first closed for each readout step (while charge is being generated in the detector element) and the transfer gate is temporarily opened by a brief transfer control pulse to allow a transfer of at least some of the charge to the readout node. A readout result is generated for each readout step with reference to the charge thus transferred to the readout node (e.g. by switching a voltage signal corresponding to the respective charge in the readout node to the column line 17 and by storage of the voltage signal in a capacitor 33, as explained with reference to FIG. 1). The reset device is briefly activated between two transfer control pulses following one another, i.e. after the generation of a readout result or before the application of the next transfer control pulse.

Since charge can be deleted in the respective pixel with a readout step taking place before the last readout step and since thus "space" can be provided for further charge carriers, the charge amount can be considerably increased which can be read out in total from the respective pixel during a single exposure procedure. The readout results of the individual readout steps can in particular be offset against one another, for example added, optionally with different weightings, to determine an output value for the charge generated in the respective pixel during the exposure procedure. The saturation limit is hereby increased and thus the maximum input signal or the maximum possible exposure of the respective pixel.

Only the last transfer control pulse makes it possible to transfer the charge then present in the detector element completely into the readout node. The potential of the channel disposed beneath the transfer gate is in particular reduced to a value in the last readout step which allows a complete outflow of charge carriers located in the potential well of the detector element. Graphically expressed, the potential of the aforesaid channel and thus the potential of the wall bounding the potential well is reduced to a value which lies beneath the potential value of the potential well bottom.

The control value of the transfer control pulse of a readout step taking place before the last readout step is reduced with respect to the control value of the transfer control pulse of the last readout step and is selected such that a residual charge remains in the detector element after the readout step, i.e. the potential of the aforesaid channel then has a value which lies between the potential value of the margin of the potential well of the detector element and the potential value of the potential well bottom. On a transfer control pulse of a readout step taking place before the last readout step, charge is only transferred if the charge then present in the detector element is larger than the aforesaid residual charge. If the respective pixel is read out more than twice during a single exposure procedure, all control values of the transfer control pulses of the readout steps taking place before the last readout step are selected as described above.

In other words, the last transfer control pulse has a control value which completely opens the transfer gate (to read out completely the charge present in the detector element). The transfer control pulses applied before the last transfer control pulse, in contrast, have a respective control value which only partly opens the transfer gate (wherein a residual charge remains in the detector element each time, provided a charge is still present there at all).

At low exposure, only a small charge amount is generated in the detector element. If this charge amount is below the aforesaid residual charge, this charge amount can only be read out by the last readout step, but not—also not partly—by the remaining readout step or steps. At low exposure, it is consequently sufficient only to take account of the last readout step in the determination of an output value for the charge generated in the respective pixel during the exposure time, i.e. in the evaluation of the charge generated during a single exposure procedure. The remaining readout step or steps can be completely ignored. It is hereby achieved that—despite the readout being multistep per se—the aforesaid thermal noise does not increase which rises with the root of the number of evaluated readout steps. A particular advantage of the invention lies in the fact that the total charge generated in the detector element is read out and can be used, i.e. the total charge generated contributes to the generation of the named readout result.

In sum, an increase in the maximum signal input of the image sensor can therefore be reached without the thermal noise increasing, i.e. the image sensor continues to have high light sensitivity. An increased dynamic range thereby results.

Switchable capacities for the pixels can thus be dispensed with in the image sensor in accordance with the invention. Such switchable capacities admittedly increase the dynamic range, but they reduce the light sensitivity since the space required by the respective capacitance, a respective additional transistor for the capacitance and an additional control line is no longer available for the respective detector element. In addition, unwanted calibration operations are required with such switchable capacitances.

The exposure procedure named in connection with the invention is characterized in that the charge present in the detector element is only completely read our or removed at the end of the exposure procedure, i.e. the aforesaid residual charge is maintained up to the last readout step of the respective exposure procedure. The reset device is in particular not simultaneously activated with the application of a transfer control pulse to the transfer gate during the single exposure procedure—except for after the last readout step—i.e. the detector element is not actively reset. Where the reset device is activated during the exposure procedure in connection with the invention, this means that only the charge present at the readout node is removed or is admittedly reset to a reference value (in accordance with the "Reset 1" explained with reference to FIG. 1) without also emptying the detector element by a simultaneous opening of the transfer gate (which would correspond to the "Reset 2" explained with reference to FIG. 1).

It is generally possible that—provided more than two readout steps are carried out during a single exposure procedure—the transfer control pulses applied before the last transfer control pulse at least partly have control values different from one another. Accordingly, different residual charges can remain in the detector element. These transfer control pulses, however, preferably have identical control values. The determination of the aforesaid output value is hereby simplified.

In accordance with an embodiment of the invention, the time intervals between the individual readout steps are identical.

In accordance with another embodiment of the invention, in contrast, the time intervals between the individual readout steps are at least partly different from one another. A further increase in the dynamic range of the image sensor is hereby possible with respect to the embodiment of the image sensor with the equally spaced apart readout times, as will be explained in more detail in the following.

Precisely two readout steps can in particular take place, wherein the first readout step takes place at a time which lies within the last M % of the duration of the exposure procedure, where M has a value of 50 as a maximum and in particular the value 50, 40, 30, 20 or 10. The exposure procedure is in this respect divided into a first time segment and into a second time segment following thereon. The maximum signal input of the respective pixel can in this respect be increased by a factor which depends on the relationship of the duration of the first time segment to the duration of the second time segment and on the level of the respective transfer control pulse with which the transfer gate is partly opened. It is disadvantageous in this respect in some applications that different motion blurring and different positions in the image (=spatial displacement) arise due to the different durations of the two aforesaid time segments with moved motifs. In particular the spatial displacement results in errors in the color reconstruction or color interpolation in image sensors which are provided with a color mosaic mask.

To avoid this problem, it is preferred if N readout steps take place, where N≥3, and where the exposure procedure is divided into N time segments (i.e. time sections, time intervals) which are ended by a respective readout step.

An odd number N of readout steps or time segments can then be provided, for example, wherein the time center of a middle time segment coincides at least substantially with the time center of the exposure procedure. If namely the readout result of the readout step which ends the middle time segment is used as the basis for determining the aforesaid output value, the aforesaid spatial displacement is also practically precluded with fast moving objects. Independently of whether the number N of readout steps or time segments is even or odd, it is preferred if at least one pair or one respective pair of readout steps taking place before the last readout step is distributed symmetrically about the time center of the exposure procedure.

It is preferred in this respect if the middle time segment is shorter than all other time segments. At high exposure, namely only the shortest of all time segments is preferably used for determining the aforesaid output value, in particular when only the readout result of the readout step which ends the shortest time segment is not overdriven, i.e. the detector element was in saturation at all other readout times.

It is generally preferred in this respect if time segments closer to the time center of the exposure procedure are shorter than time segments further away from the time center of the exposure procedure. If only shorter time segments are used as the basis for determining the aforesaid output value—since the readout results which end longer time segments are overdriven—the aforesaid spatial displacement can in turn be at least substantially prevented. In this respect, a middle time segment does not necessarily have to be present. It is rather the case that a readout step can also be carried out at the time center of the exposure procedure.

The readout steps taking place before the last readout step preferably take place—optionally with the exception of a readout step which is carried out at the time of the exposure procedure—at times which are distributed symmetrically about the time center of the exposure procedure. An unwanted spatial displacement can also hereby be better avoided with fast moving motifs.

In accordance with an embodiment of the invention, at least when the readout result of the last readout step does not exceed a preset minimal value and the readout result or results does/do not exceed a preset limit value, the readout result of only the last readout step is used as the basis for determining an output value for the charge generated during the ongoing charge generation in a single exposure procedure in the respective pixel. It can hereby be achieved that the thermal noise is not increased at low exposure, as was already explained above. The preset minimal value is preferably larger than a readout result which corresponds to the aforesaid residual charge and/or smaller than a readout result which corresponds to double the residual charge.

It is generally also possible in this respect that a readout result of a readout step which took place before the last readout step is additionally used as the basis for determining the output value, said result exceeding the preset limit value. This is in particular of advantage if the exposure or the brightness during the exposure procedure was not constant, for example if a flash occurred which is, however, not detectable by the last readout step, but rather only by one or more of the other readout steps. The preset limit value can in this respect be selected in dependence on the readout result of the last readout step of the previous readout. It is preferred in this respect to select the preset limit value the higher, the lower the readout result of the last readout step of the previous readout.

If the readout result of the last readout step exceeds the aforesaid preset minimal value, the readout result of at least one of the readout steps which took place before the last readout step is preferably used as the basis for determining the aforesaid output value, provided the readout result of the at least one of the readout steps which took place before the last readout step does not exceed a preset maximum value. The readout result of the at least one of the readout steps which took place before the last readout step is in this respect preferably offset against the readout result of the last readout step, provided the readout result of the last readout step does not exceed the aforesaid preset maximum value, in order then to increase the maximum signal input of the respective pixel, as was already described in the above in connection with claim 1. The preset maximum value is preferably a value which corresponds at least substantially to the saturation limit of the respective pixel.

In this respect, all those readout results of the readout steps which took place before the last readout step are used as the basis for determining the output value which do not reach the preset maximum value. These readout results can generally only be the readout result of the last readout step, only the readout result of at least one of the readout steps which took place before the last readout step or a combination of these two possibilities.

The invention furthermore relates to a corresponding method for the reading out of an image sensor, in particular of a CMOS image sensor, for digital cameras.

Preferred embodiments of the method in accordance with the invention result in an analog manner from the preferred embodiments of the image sensor in accordance with the invention.

Non-restricting embodiments of the invention are shown in the drawing and will be described in the following.

Figure 2:
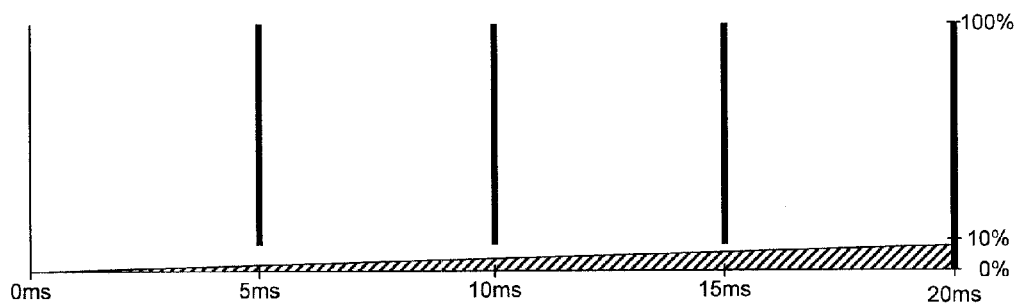
Figure 3:
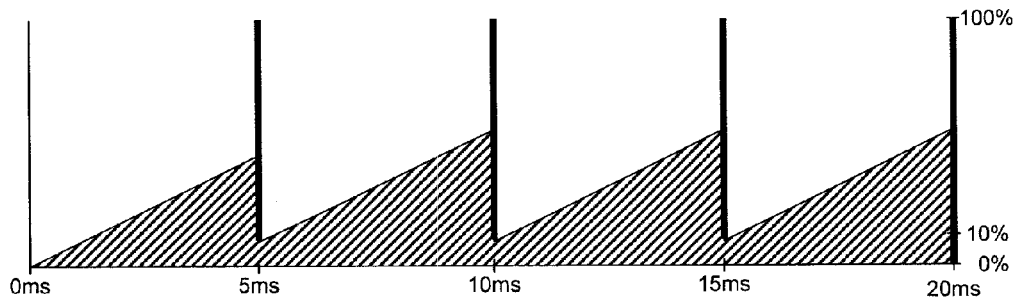
Figure 4:
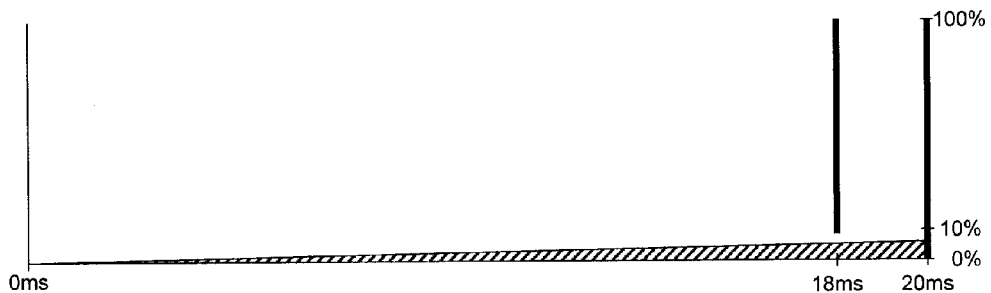
Figure 5:
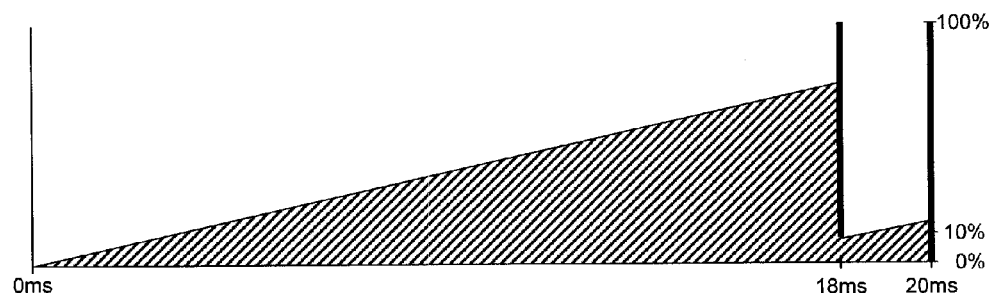
Figure 6:
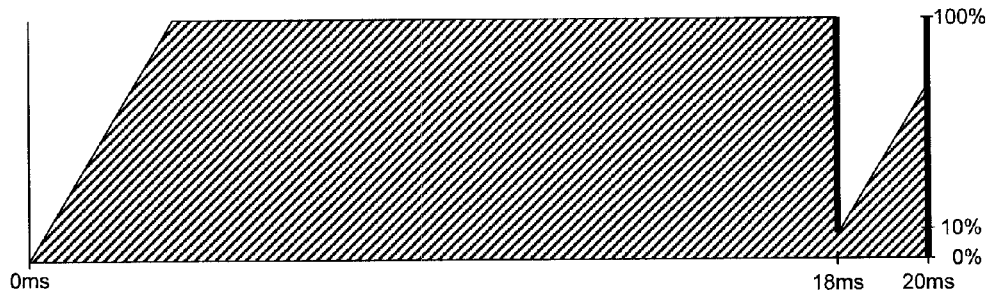
Figure 7:
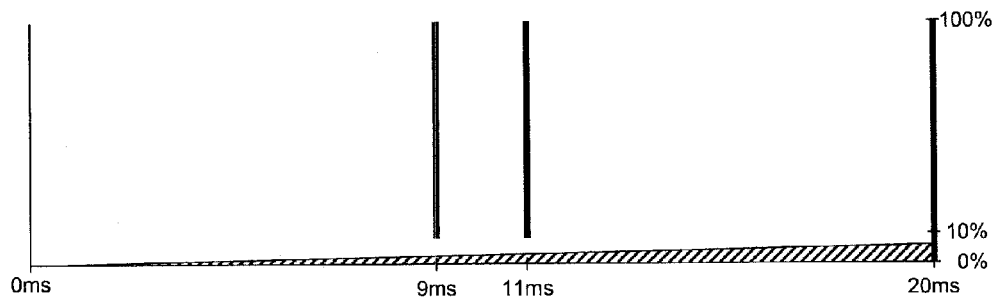
Figure 8:
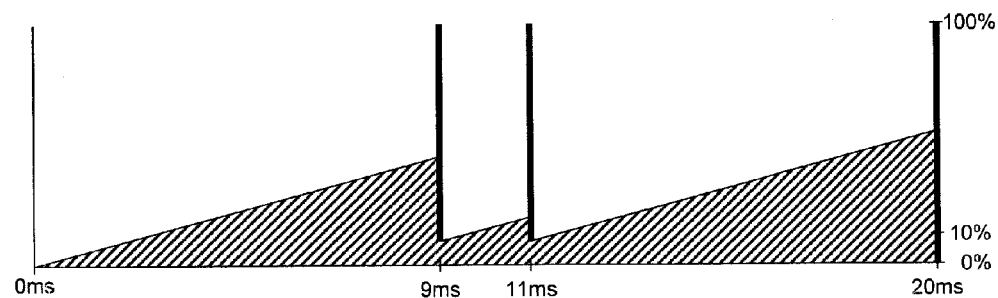
Figure 9:
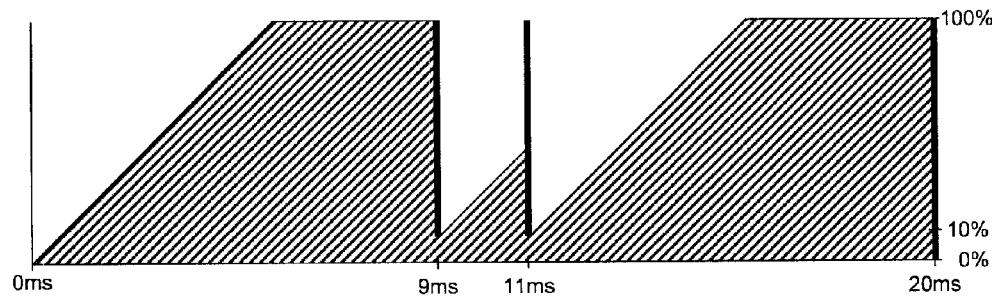
Figure 10:
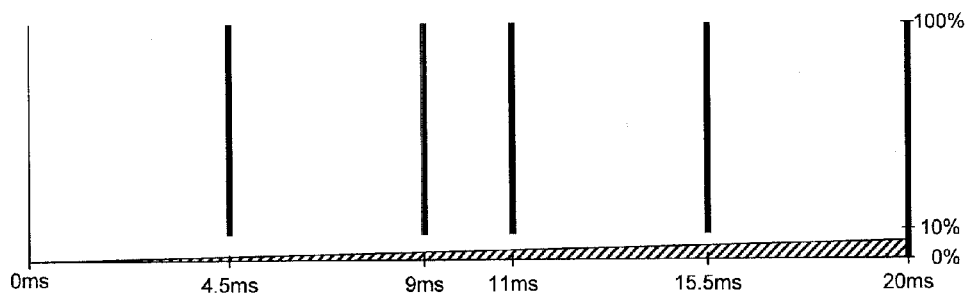
Figure 11:
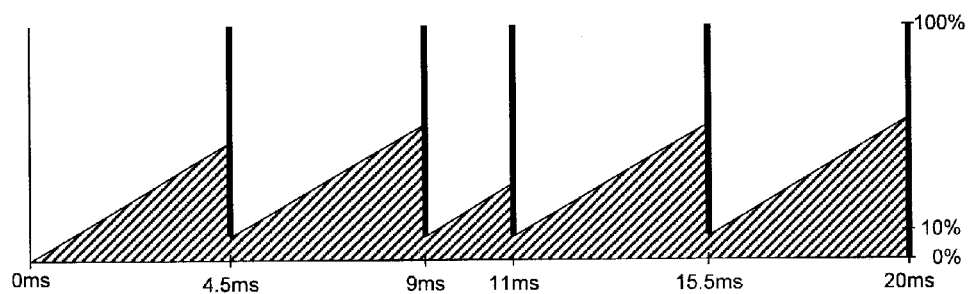
Figure 12:
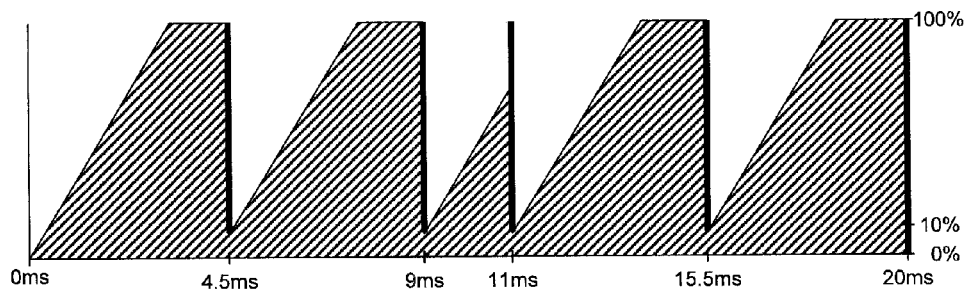

There are shown, schematically in each case:

FIG. 1 a four-transistor CMOS image sensor, wherein, of the image sensor, only one pixel with a detector element and a column amplifier circuit associated with the pixel is shown;

FIGS. 2 and 3 the time profile of the charge present in the detector element of FIG. 1 during a single exposure procedure, at different exposures, in accordance with a first embodiment of the invention;

FIGS. 4 to 6 the time profile of the charge present in the detector different exposures, in accordance with a second embodiment of the invention;

FIGS. 7 to 9 the time profile of the charge present in the detector element of FIG. 1 during a single exposure procedure, at different exposures, in accordance with a third embodiment of the invention;

FIGS. 10 to 12 the time profile of the charge present in the detector element of FIG. 1 during a single exposure procedure, at different exposures, in accordance with a fourth embodiment of the invention; and FIGS. 13 to 16 the time profile of the charge present in the detector element of FIG. 1 during a single exposure procedure, at different exposures, in accordance with a fifth embodiment of the invention.

The image sensor in accordance with the present invention is read out during the ongoing charge generation in a single exposure procedure in a plurality of directly sequential readout steps. To make this possible, provision is, for example, made that the image sensor (not shown) in accordance with the invention includes, with respect to the image sensor of FIG. 1, a plurality of capacitors 33 in which the readout results of the individual readout steps can be stored independently of one another, i.e. just as many capacitors 33 are provided as readout steps can be carried out. The plurality of readout results are, however, in particular clocked out directly in a plurality of directly sequential readout clocks so that it is sufficient if only one capacitor 33 is present. It can, however, be advantageous to provide a plurality of capacitors for other reasons. An output value for the charge generated during the exposure procedure in the respective pixel 11 can then be determined on the basis of those readout results which are not overdriven.

In the following embodiments, the exposure time of a single exposure procedure amounts by way of example to 20 ms. An exposure constant over the exposure time is only assumed in the Figures for the simpler explanation of the invention.

In the first embodiment in accordance with FIGS. 2 and 3, the respective pixel 11 is read out in four readout steps, and indeed at the times 5 ms, 10 ms, 15 ms and 20 ms. The time intervals between the individual readout steps then each amount to 5 ms. The charge present in the detector element 15 is entered on the ordinate axis. The saturation limit of the detector element 15 is reached at 100%. On each readout step, the transfer gate 39 is temporarily opened to make it possible that charge from the detector element 15 can be transferred into the readout node 41 and can subsequently be used to produce a respective readout result.

In the last readout step at 20 ms, the transfer gate 39 is completely opened so that the total charge located in the detector element 15 at this time can be transferred into the readout node 41. The complete opening of the transfer gate 39 at 20 ms is illustrated by a perpendicular bar in FIGS. 2 and 3 which extends over the total ordinate axis, i.e. over the total range from 0% to 100%.

At the readout times 5 ms, 10 ms and 15 ms, in contrast, the transfer gate 39 is not completely opened, but only partly opened, i.e. no charge is transferred into the readout node 41 when the detector element 15 only contains very little charge at the respective time. In the example selected, only that portion of the charge then contained in the detector element 15 can be transferred which exceeds a degree of filling of the detector element 15 of 10%. This is illustrated in each case by a perpendicular bar at the times 5 ms, 10 ms and 15 ms which only extends over the range from 10% to 100% of the ordinate axis. If the detector element 15, for example, contains 40% of the maximum possible charge, only 30% of the maximum possible charge is transferred at a readout step with an only partial opening of the transfer gate 39.

At low exposure, only very little charge is generated during the exposure procedure in the detector element, as is shown in FIG. 2.

Since charge is only transferred in the readout steps at the times 5 ms, 10 ms and 15 ms when the detector element 15 is filled to more than 10%, it can be recognized simply with reference to the last readout step at the time 20 ms whether charge was transferred at the read outs which had previously taken place. In the selected example, charge was only transferred at the readout steps which had previously taken place when a charge amount of more than 13.3% was read out at the last readout step.

The limit of 13.3% in this respect results as follows: So that charge can be transferred at one of the readout steps which had taken place before the last readout step, the charge located in the detector element 15 at the time 15 ms must amount to at least 10%, i.e. at least 3.3% charge must have collected per 5 ms. If 3.3% of charge is collected in the last 5 ms, the value of 13.3% results.

If it was recognized that no charge was transferred in the readout steps at the times 5 ms, 10 ms and 15 ms, the readout results of these readout steps can be ignored in the determination of an output value for the charge generated during the ongoing charge generation in a single exposure procedure in the respective pixel 11. Since ultimately thus only a single readout step is evaluated, an increase in the thermal noise, which otherwise increases with the square of the number of evaluated readout steps, can be avoided at a low exposure.

It is generally conceivable to fix the limit of 13% for the transition from the exclusive use of the last readout result to the use of the readout results of all readout steps in the determination of the aforesaid output value lower, e.g. at 10%. The respective fixed limit in this respect corresponds to a preset minimum value.

It is in particular of advantage, provided the aforesaid limit value is not fixed lower, also to examine the readout results of the readout steps which had previously taken place when the last readout result is below the preset minimum value. The exposure or the brightness may, for example, not have been constant during the exposure procedure so that charge was actually read out in one of the readout steps which had previously taken place without this having been able to be recognized with reference to the last readout result (since the exposure was so low that less than 3.3% charge was collected in the last 5 ms). If it is found in this examination that the readout result of a readout step which had taken place before the last readout step is larger than a preset limit value, this readout result can then likewise be taken into account in the determination of the aforesaid output value.

At a higher exposure, as is shown in FIG. 3, charges are read out in every readout step. Consequently, in the example in accordance with FIG. 3, the readout results of all readout steps are used as the basis for determining the aforesaid output value, in particular by addition of the charges. At a maximum, 80% charge can be read out at the readout time 5 ms, 90% charge in each case at the readout times 10 ms and 15 ms, and 100% charge at the readout time 20 ms. The maximum input signal of the respective pixel 11 can thus be increased to 360% overall. Since the thermal noise is not simultaneously increased at low exposure, as was explained above, an extension of the dynamic range by the factor 3.6 can be achieved overall.

If a plurality of readout steps are used as the basis for determining the aforesaid output value, the thermal noise is slightly increased. As already explained above, the thermal noise for a readout step amounts e.g. to 5 electrons. With four readout steps, the thermal noise is thus increased to 10 electrons (=square root of $(4 \times 5^2)$). If the readout result at the readout time 20 ms amounts e.g. to 13.4%, this corresponds to a charge of 4,020 electrons (=30,000 electrons×13.4%). With this charge amount, the so-called shot noise amounts to 63.4% (=square root of 4,020) electrons. The total noise with a fourfold readout thus amounts to 64.2 electrons (=square root of $(63.4^2+10^2)$); with a single readout, however, likewise already 63.6 electrons (=square root of $(63.4^2+5^2)$) so that the increase in the total noise due to the multiple reading out can ultimately be neglected.

In the second embodiment in accordance with FIGS. 4 to 6, the maximum brightness which can be evaluated can be further increased. In this respect, the fact is utilized that the individual readout steps no longer take place at the same time intervals from one another. In the selected example, a first readout step takes place at 18 ms and a second readout step at 20 ms. Three cases can be distinguished here in accordance with the three FIGS. 4 to 6.

In FIG. 4, the exposure is relatively low. Charges are only read out in the second readout step. In this case, only the readout result of the second readout step is used as the basis for determining the aforesaid output value.

FIG. 5 shows the time profile of the charge contained in the detector element 15 at a mean exposure. Charges are here already transferred in the first readout step. The readout result of the first readout step is not overdriven. The readout results of both readout steps can therefore be used as the basis for determining the aforesaid output value. The sum of the two readout results is in particular calculated for this purpose. If a charge transferred with the first transfer control pulse from the detector element 15 to the readout node 11 were not read out, but only deleted, only a single readout result could be used as the basis for the aforesaid readout value even with a mean exposure in accordance with FIG. 5, namely the second readout result.

Only at a relatively high exposure, as is shown in FIG. 6, is the readout result of the first readout step overdriven, i.e. the readout result exceeds a preset maximum value. Since the charge present in the detector element 15 at this time was read out in the first readout step down to 10% and was thus deleted, the charge amount which is present in the second readout step and exceeds 10% charge must have arisen in the 2 ms between the two readout steps. A substantially higher exposure or brightness can be evaluated by the respective pixel 11 due to this much shorter effective exposure time—2 ms instead of 20 ms. An overdrive only occurs at 900% brightness in this example.

It is, however, disadvantageous in this respect that different motion blurring and above all different positions arise in the image, i.e. a spatial displacement occurs, due to the different exposure times.

Such a spatial displacement can be at least largely avoided in the third embodiment in accordance with FIGS. 7 to 9. This can be achieved in that the time center of the time period of the exposure procedure which is used as the basis in each case for determining the aforesaid output values coincides with the time center of the exposure procedure. Three readout steps take place overall, namely at the times 9 ms, 11 ms and 20 ms. The time period from 0 ms to 9 ms represents a front time segment, the time period from 9 ms to 11 ms a middle time segment and the time period from 11 ms to 20 ms a rear time segment. Generally, a time segment is defined by the start of the exposure procedure (removal of residual charges from the detector element 15) and the subsequent readout step or by two directly sequential readout steps. Three cases can in turn be distinguished here in accordance with the three FIGS. 7 to 9.

At low exposure (FIG. 7), charges are only read out in the last readout step at 20 ms. Accordingly—as in FIG. 4—only the readout result of the last readout step is used for determining the aforesaid output value. The time period of the exposure procedure which is used as the basis for determining the aforesaid output value corresponds to the time period from 0 ms to 20 ms.

At a mean exposure (FIG. 8), charges are transferred at all three readout steps and none of the corresponding readout results is overdriven. In this case—as in FIG. 5—all readout results are used for determining the aforesaid output value, i.e. the total charge generated in the detector element 15 is read out and contributes to the production of the readout results. The sum of the three readout results is in particular calculated for this purpose. The time period of the exposure procedure which is used as the basis for determining the aforesaid output value corresponds in turn to the time period from 0 ms to 20 ms.

Only at a relatively high exposure (FIG. 9) is the readout result of at least the third readout step at 20 ms overdriven. The readout result of the second readout step at 11 ms is, however, not overdriven. Since the charge present in the detector element 15 at this time was deleted down to 10% by the first readout step at 9 ms, the charge amount which is present in the second readout step and exceeds 10% charge must necessarily have arisen in the 2 ms between the first readout step and the second readout step. As in FIG. 6, a substantially higher exposure can be evaluated due to the much shorter effective exposure time. An overdrive only occurs at 900% brightness in this example.

In the third embodiment, the time period of the exposure procedure which is used as the basis for determining the aforesaid output value, i.e. the effective exposure time, can therefore amount either to 20 ms (FIGS. 7 and 8) or to 2 ms (FIG. 9). The time center in each case is at 10 ms for both time periods. Since the time center of the effective exposure time on the transition from a situation in accordance with FIGS. 7, 8 to a situation in accordance with FIG. 9 does not change, the position of bright objects in the image is also maintained.

The third embodiment (short middle time segment) and the first embodiment (identical time segments) can also be combined to a fourth embodiment, as is shown in FIGS. 10 to 12. It is thus possible, for example, with five readout steps to carry out the readout steps with only a part opening of the transfer gate 39 at the times 4.5 ms, 9 ms, 11 ms and 15.5 ms and the complete readout step in turn at 20 ms.

In the fifth embodiment in accordance with FIGS. 13 to 16, which represents a further development of the third embodiment, the individual readout steps take place such that not only two, but also three time periods of the exposure procedure are present which can be used as the basis in each case in dependence on the exposure for determining the aforesaid output value. The three time periods in the selected example amount to 0.4 ms, 3 ms and 20 ms. This is achieved in that the readout steps are carried out at the times 8.5 ms, 9.8 ms, 10.2 ms, 11.5 ms and 20 ms, i.e. a front time segment arises with a duration of 8.5 ms, a time segment following thereon with a duration of 1.3 ms, a middle time segment with a duration of 0.2 ms, a time segment following thereon with a duration of in turn 1.3 ms, and a rear time segment with a duration in turn of 8.5 ms. Four cases can now be distinguished.

Figure 13:
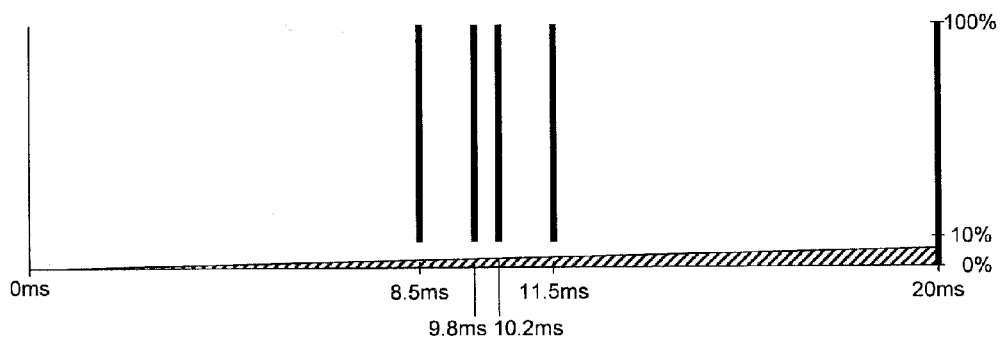
Figure 14:
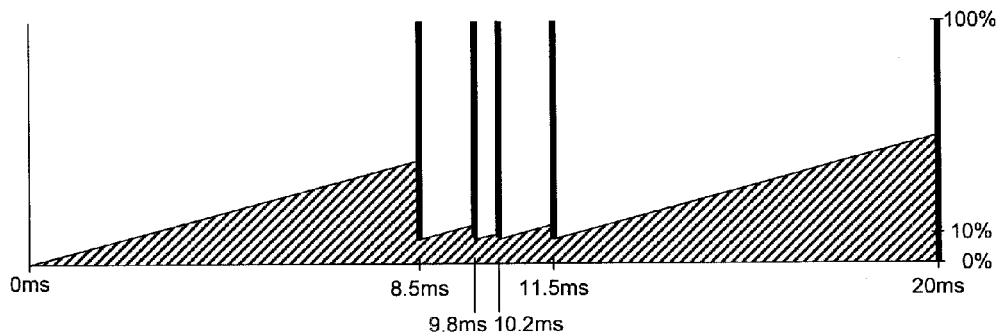
Figure 15:
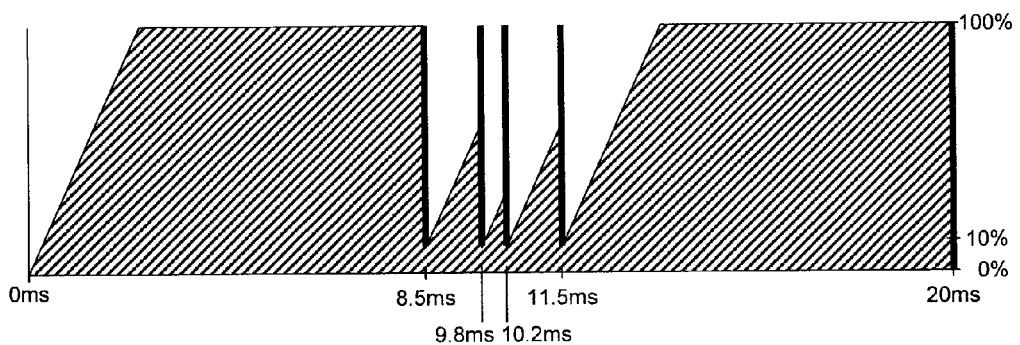

At a low exposure, such as is in FIG. 13, charge is only transferred at the last readout step. As in FIGS. 4 and 7—only the readout result of the last 20 readout step is used for determining the aforesaid output value. The effective exposure time amounts to 20 ms.

At the mean exposure (FIG. 14), charge is transferred at all four readout steps and none of the corresponding readout results is overdriven. As in 25 FIGS. 5 and 8, all readout results are therefore used, in particular added up, for determining the aforesaid output value. The effective exposure time amounts in turn to 20 ms.

At a higher exposure (FIG. 15), the readout result of at least the last readout step is overdriven, optionally additionally also the readout result of the first readout step. The readout results of the readout steps at the times 9.8 ms, 10.2 ms and 11.5 ms are, in contrast, not overdriven. These three readout results are now added up to determine the aforesaid output value. The effective exposure time amounts to 3 ms.

Figure 16:
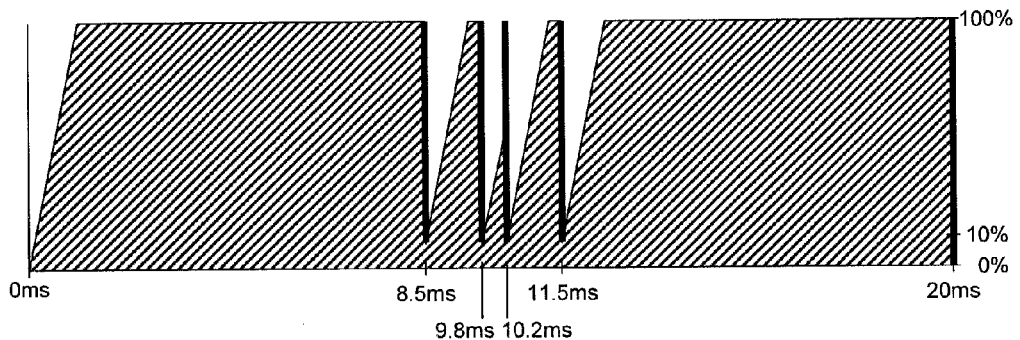

At a high exposure, as is shown in FIG. 16, only the readout result of the readout step at the time 10.2 is not overdriven so that the determination of the aforesaid output value is also only based on this readout result. The effective exposure only amounts to 0.4 ms.

In the described image sensor or in the described method, the maximum light sensitivity of a pixel is maintained since the thermal noise is not increased at a low exposure or brightness. The maximum input signal of the respective pixel can be increased by the readout of the charge generated during a single exposure procedure in a plurality of readout steps as early as during the charge generation. The dynamic range of the pixels of an image sensor can therefore be extended by the present invention.

REFERENCE NUMERAL LIST 11 pixel
13 column amplifier circuit
15 pinned diode
17 column line
27 first capacitor
31 amplifier
33 second capacitor
35 positive input
36 output
37 negative input
39 transfer gate
41 readout node
43 converter FET
45 reset FET
47 selection FET
49 switch
51 positive voltage supply
53 control device

The invention claimed is:

1. An image sensor, in particular a CMOS image sensor, for digital cameras,
having a plurality of pixels (11) arranged in rows and columns, with the respective pixel (11) comprising:
light-sensitive detector element (15) to generate electrical charge from incident light during an exposure procedure; a readout node (41);
a transfer gate (39) to which a transfer control pulse can be applied to enable a charge transfer from the detector element (15) to the readout node (41); and
a reset device (45) to reset a charge present in the readout node (41) to a reference value;
and having a control device (53) for the control of the transfer gate (39) and of the reset device (45) of the respective pixel (11), wherein the control device (53) is designed so that the respective pixel (11) is read out in a plurality of readout steps during an ongoing charge generation within a single exposure procedure, namely such that a respective transfer control pulse is applied to the transfer gate (39) for each of the plurality of readout steps and a respective readout result is then produced; wherein the reset device (45) is activated between the transfer control pulses of the respective exposure procedure; wherein only the last transfer control pulse enables a complete charge transfer of the respective charge present in the detector element (15) to the readout node (41): wherein N readout steps take place, where N≥3 wherein the exposure procedure is divided into N time segments which are ended by a respective readout step; and wherein time segment disposed closer to a time center of the exposure procedure is shorter than a time segment disposed further away from the tithe center of the exposure procedure.

2. An image sensor in accordance with claim 1, wherein the transfer control pulses applied before the last transfer control pulse have identical control values.

3. An image sensor in accordance with claim 1, wherein the time intervals between the individual readout steps are identical.

4. An image sensor in accordance with claim 1, wherein the time intervals between the individual readout steps are at least partly different from one another.

5. An image sensor in accordance with claim 4, wherein precisely two readout steps take place; wherein the first readout step takes place at a time which lies within the last M % of the duration of the exposure procedure, where M has the value at a maximum of 50 and in particular the value 10.

6. An image sensor in accordance with claim 1, wherein the readout steps taking place before the last readout step take place at times which are distributed symmetrically about a time center of the exposure procedure.

7. An image sensor in accordance with claim 1, wherein the number N of the time segments is odd; wherein a time center of the exposure procedure falls in a middle time segment of the N time segments.

8. An image sensor in accordance with claim 7, wherein time segments disposed closer to the time center of the exposure procedure are shorter than time segments disposed further away from the time center of the exposure procedure.

9. An image sensor in accordance with claim 7, wherein the readout steps taking place before the last readout step take place at times which are distributed symmetrically about the time center of the exposure procedure.

10. An image sensor in accordance with claim 1, wherein the number N of the time segments is odd; wherein a middle time segment of the N time segments is shorter than the others of the N time segments.

11. An image sensor in accordance with claim 10, wherein the readout steps taking place before the last readout step take place at times which are distributed symmetrically about a time center of the exposure procedure.

12. An image sensor in accordance with claim 1, wherein at least one pair of readout steps which take place before the last readout step is distributed symmetrically about a time center of the exposure procedure.

13. An image sensor in accordance with claim 1, wherein, at least when the readout result of the last readout step does not exceed a preset minimal value and the readout result or results of the readout steps which took place before the last readout step does or do not exceed a preset limit value, the readout value of only the last readout step is used as the basis for determining an output value for the exposure procedure.

14. An image sensor in accordance with claim 13, wherein a readout result of a readout step which took place before the last readout step is additionally used as the basis for determining the output value, said result exceeding the preset limit value.

15. An image sensor in accordance with claim 1, wherein, when the readout result of the last readout step exceeds a preset minimal value, the readout result of at least one of the readout steps which took place before the last readout step is used as the basis for determining an output value for the exposure procedure provided that the readout result of the respective readout step does not exceed a preset maximum value.

16. An image sensor in accordance with claim 15, wherein all those readout results of the readout steps which took place before the last readout step are used as the basis for determining the output value which do not exceed the preset maximum value.

17. An image sensor, in particular a CMOS image sensor, for digital cameras,
having a plurality of pixels (11) arranged in rows and columns, with the respective pixel (11) comprising:
light-sensitive detector element (15) to generate electrical charge from incident light during an exposure procedure; a readout node (41);
a transfer gate (39) to which a transfer control pulse can be applied to enable a charge transfer from the detector element (15) to the readout node (41); and
a reset device (45) to reset a charge present in the readout node (41) to a reference value;
and having a control device (53) for the control of the transfer gate (39) and of the reset device (45) of the respective pixel (11), wherein the control device (53) is designed so that the respective pixel (11) is read out in a plurality of readout steps during an ongoing charge generation within a single exposure procedure, namely such that a respective transfer control pulse is applied to the transfer gate (39) for each of the plurality of readout steps and a respective readout result is then produced; wherein the reset device (45) is activated between the transfer control pulses of the respective exposure procedure; wherein only the last transfer control pulse enables a complete charge transfer of the respective charge present in the detector element (15) to the readout node (41); wherein N readout steps take place, where N≥3; wherein the exposure procedure is divided into N time segments which are ended by a respective readout step; and wherein at least one pair of readout steps which take place before the last readout step is distributed symmetrically about a time center of the exposure procedure.

18. An image sensor, in particular a CMOS image sensor, for digital cameras,
having a plurality of pixels (11) arranged in rows and columns, with the respective pixel (11) comprising:
light-sensitive detector element (15) to generate electrical charge from incident light during an exposure procedure; a readout node (41);
a transfer gate (39) to which a transfer control pulse can be applied to enable a charge transfer from the detector element (15) to the readout node (41); and
a reset device (45) to reset a charge present in the readout node (41) to a reference value;
and having a control device (53) for the control of the transfer gate (39) and of the reset device (45) of the respective pixel (11), wherein the control device (53) is designed so that the respective pixel (11) is read out in a plurality of readout steps during an ongoing charge generation within a single exposure procedure, namely such that a respective transfer control pulse is applied to the transfer gate (39) for each of the plurality of readout steps and a respective readout result is then produced; wherein the reset device (45) is activated between the transfer control pulses of the respective exposure procedure; wherein only the last transfer control pulse enables a complete charge transfer of the respective charge present in the detector element (15) to the readout node (41); wherein N readout steps take place, where N≥3; wherein the exposure procedure is divided into N time segments which are ended by a respective readout step; and, wherein, at least when the readout result of the last readout step does not exceed a preset minimal value and the readout result or results of the readout steps which took place before the last readout step does or do not exceed a preset limit value, the readout value of only the last readout step is used as the basis for determining an output value for the exposure procedure.

19. An image sensor, in particular a CMOS image sensor, for digital cameras, having a plurality of pixels (11) arranged in rows and columns, with the respective pixel (11) comprising: light-sensitive detector element (15) to generate electrical charge from incident light during an exposure procedure; a readout node (41); a transfer gate (39) to which a transfer control pulse can be applied to enable a charge transfer from the detector element (15) to the readout node (41); and a reset device (45) to reset a charge present in the readout node (41) to a reference value; and having a control device (53) for the control of the transfer gate (39) and of the reset device (45) of the respective pixel (11), wherein the control device (53) is designed so that the respective pixel (11) is read out in a plurality of readout steps during an ongoing charge generation within a single exposure procedure, namely such that a respective transfer control pulse is applied to the transfer gate (39) for each of the plurality of readout steps and a respective readout result is then produced; wherein the reset device (45) is activated between the transfer control pulses of the respective exposure procedure; wherein only the last transfer control pulse enables a complete charge transfer of the respective charge present in the detector element (15) to the readout node (41); and wherein, when the readout result of the last readout step exceeds a preset minimal value, the readout result of at least one of the readout steps which took place before the last readout step is used as the basis for determining an output value for the exposure procedure provided that the readout result of the respective readout step does not exceed a preset maximum value.

20. An image sensor, in particular a CMOS image sensor, for digital cameras,
    having a plurality of pixels (11) arranged in rows and columns, with the respective pixel (11) comprising:
        light-sensitive detector element (15) to generate electrical charge from incident light during an exposure procedure; a readout node (41);
        a transfer gate (39) to which a transfer control pulse can be applied to enable a charge transfer from the detector element (15) to the readout node (41); and
        a reset device (45) to reset a charge present in the readout node (41) to a reference value;
    and having a control device (53) for the control of the transfer gate (39) and of the reset device (45) of the respective pixel (11), wherein the control device (53) is designed so that the respective pixel (11) is read out in a plurality of readout steps during an ongoing charge generation within a single exposure procedure, namely such that a respective transfer control pulse is applied to the transfer gate (39) for each of the plurality of readout steps and a respective readout result is then produced; wherein the reset device (45) is activated between the transfer control pulses of the respective exposure procedure; wherein only the last transfer control pulse enables a complete charge transfer of the respective charge present in the detector element (15) to the readout node (41); wherein N readout steps take place, where N≥3; wherein the exposure procedure is divided into N time segments which are ended by a respective readout step; and wherein the number N of the time segments is odd; wherein a time center of the exposure procedure falls in a middle time segment of the N time segments.

* * * * *